US010560338B2

(12) United States Patent
McClintock et al.

(10) Patent No.: US 10,560,338 B2
(45) Date of Patent: Feb. 11, 2020

(54) EVENT-BASED DATA PATH DETECTION

(71) Applicant: Amazon Technologies, Inc., Seattle, WA (US)

(72) Inventors: Jon Arron McClintock, Seattle, WA (US); Dominique Imjya Brezinski, Henderson, NV (US); Tushaar Sethi, Seattle, WA (US); Maarten Van Horenbeeck, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/829,725

(22) Filed: Dec. 1, 2017

(65) Prior Publication Data

US 2018/0091375 A1   Mar. 29, 2018

Related U.S. Application Data

(63) Continuation of application No. 14/224,544, filed on Mar. 25, 2014, now Pat. No. 9,838,260.

(51) Int. Cl.
*H04L 12/24* (2006.01)
*H04L 12/733* (2013.01)

(52) U.S. Cl.
CPC ............ *H04L 41/12* (2013.01); *H04L 45/122* (2013.01)

(58) Field of Classification Search
CPC ....... H04L 41/12; H04L 45/122; B23B 29/26; B23B 3/065; B23B 3/167; B23Q 15/013; B23Q 1/628; B23Q 2039/004; B23Q 2039/006; B23Q 2039/008; B23Q 39/022; B23Q 39/025; Y10T 29/5114

USPC ........................................................ 370/254
See application file for complete search history.

(56) References Cited

U.S. PATENT DOCUMENTS

| | | | |
|---|---|---|---|
| 5,941,947 A | 8/1999 | Brown et al. | |
| 6,493,796 B1 | 12/2002 | Arnon et al. | |
| 7,596,672 B1 | 9/2009 | Gole et al. | |
| 7,712,078 B1 | 5/2010 | Mirchandani | |
| 7,774,363 B2 | 8/2010 | Lim | |
| 7,869,425 B2 | 1/2011 | Elliott et al. | |
| 8,099,760 B2 | 1/2012 | Cohen et al. | |
| 8,131,281 B1 * | 3/2012 | Hildner ............... | H04L 41/0806 455/418 |
| 8,307,003 B1 | 11/2012 | Sheth et al. | |
| 8,554,912 B1 | 10/2013 | Reeves et al. | |
| 8,682,942 B1 | 3/2014 | Lee et al. | |

(Continued)

OTHER PUBLICATIONS

Moy, "OSPF Version 2," Request for Comments: 2328, Ascend Communications, Inc, Network Working Group, Category: Standards Track, STD: 54, Obsoletes: 2178, Apr. 1998, 224 pages.

(Continued)

*Primary Examiner* — Huy D Vu
*Assistant Examiner* — Nizam U Ahmed
(74) *Attorney, Agent, or Firm* — Davis Wright Tremaine LLP

(57) ABSTRACT

A method and apparatus for path detection are disclosed. In the method and apparatus, a data path may link two path-end nodes in a network. Event data for the network may be received and may be used to determine, for each node resident on the path, proximity measures to each path-end node. The proximity measure of network nodes may be evaluated to determine whether a path exists between the two path-end nodes.

22 Claims, 9 Drawing Sheets

(56) References Cited

U.S. PATENT DOCUMENTS

| | | | |
|---|---|---|---|
| 8,995,279 B2 | 3/2015 | Massoulie et al. | |
| 8,996,482 B1 | 3/2015 | Singh et al. | |
| 9,240,955 B1 | 1/2016 | Mukhopadhyay et al. | |
| 9,294,498 B1 | 3/2016 | Yampolskiy et al. | |
| 9,794,130 B2 | 10/2017 | Jenkins et al. | |
| 2002/0132667 A1 | 9/2002 | Shoji | |
| 2003/0041180 A1 | 2/2003 | Schlussman | |
| 2003/0195987 A1 | 10/2003 | Krishnamurthy et al. | |
| 2003/0216935 A1 | 11/2003 | Keppens et al. | |
| 2004/0076164 A1 | 4/2004 | Vanderveen et al. | |
| 2004/0122747 A1 | 6/2004 | Jimenez et al. | |
| 2005/0076137 A1 | 4/2005 | Tang et al. | |
| 2005/0132220 A1 | 6/2005 | Chang et al. | |
| 2005/0193250 A1 | 9/2005 | Takeuchi et al. | |
| 2006/0021050 A1 | 1/2006 | Cook et al. | |
| 2006/0265751 A1 | 11/2006 | Cosquer et al. | |
| 2007/0276835 A1 | 11/2007 | Murthy | |
| 2008/0019378 A1 | 1/2008 | Hogan | |
| 2008/0022270 A1 | 1/2008 | Morrow et al. | |
| 2008/0028050 A1 | 1/2008 | Fiducci | |
| 2008/0071728 A1 | 3/2008 | Lim | |
| 2008/0208369 A1 | 8/2008 | Grgic et al. | |
| 2008/0208374 A1 | 8/2008 | Grgic et al. | |
| 2008/0212616 A1 | 9/2008 | Augustine et al. | |
| 2008/0320089 A1 | 12/2008 | Jung et al. | |
| 2009/0049220 A1 | 2/2009 | Conti et al. | |
| 2009/0103442 A1 | 4/2009 | Douville | |
| 2009/0157936 A1 | 6/2009 | Goss et al. | |
| 2009/0228983 A1 | 9/2009 | Qin et al. | |
| 2009/0268606 A1 | 10/2009 | DeLew et al. | |
| 2010/0124196 A1 * | 5/2010 | Bonar | H04B 7/0689 370/329 |
| 2010/0128629 A1 | 5/2010 | Sinha et al. | |
| 2010/0128640 A1 * | 5/2010 | Okamoto | H04L 45/02 370/255 |
| 2010/0251242 A1 | 9/2010 | Sivasubramanian et al. | |
| 2011/0126197 A1 | 5/2011 | Larsen et al. | |
| 2011/0131656 A1 | 6/2011 | Haviv et al. | |
| 2011/0231443 A1 | 9/2011 | Hannel et al. | |
| 2011/0277027 A1 | 11/2011 | Hayton et al. | |
| 2012/0192258 A1 | 7/2012 | Spencer et al. | |
| 2012/0203738 A1 | 8/2012 | Aigner et al. | |
| 2012/0255016 A1 | 10/2012 | Sallam | |
| 2013/0111559 A1 | 5/2013 | Lomme et al. | |
| 2013/0117766 A1 | 5/2013 | Bax et al. | |
| 2013/0132854 A1 | 5/2013 | Raleigh et al. | |
| 2013/0151388 A1 | 6/2013 | Falkenborg et al. | |
| 2013/0194966 A1 | 8/2013 | Wang et al. | |
| 2013/0339647 A1 | 12/2013 | Jindo et al. | |
| 2014/0046638 A1 | 2/2014 | Peloski | |
| 2014/0214610 A1 | 7/2014 | Moshir et al. | |
| 2015/0058993 A1 | 2/2015 | Choi et al. | |
| 2015/0133130 A1 * | 5/2015 | Gupta | H04W 76/15 455/450 |
| 2015/0163121 A1 | 6/2015 | Mahaffey et al. | |
| 2015/0205954 A1 | 7/2015 | Jou et al. | |
| 2018/0041528 A1 | 2/2018 | Machlica et al. | |

OTHER PUBLICATIONS

Moy et al., "Lab Course: Router Lab", Open Shortest Path First (OSPF), Networking Group, RFC 2328, STD 54, Apr. 1998, 20 pages.

* cited by examiner

EVENT-BASED DATA PATH DETECTION

CROSS-REFERENCE TO RELATED APPLICATION

This application is a continuation of U.S. patent application Ser. No. 14/224,544, filed Mar. 25, 2014, entitled "EVENT-BASED DATA PATH DETECTION," the content of which is incorporated by reference herein in its entirety.

BACKGROUND

In a network of computing nodes, various paths of data that carry data from one node to another node may be established within the network. Further, as the size of the network and the number of computing nodes increases, the number of potential links a node may make increases and correspondingly, the number of data paths between the nodes of the network also increases. If data paths that exist in the network are not detected, the data paths may be used for the exfiltration of data from within the network to external entities. Further, the data path may be used to subject the network to the threat of attacks by outsiders who may use the network's path to an external entity to launch attack on a network entity. Additionally, as the number of computing nodes of the network increases, tracking the connectivity of the computing nodes on a network-wide scale becomes computationally intensive.

Accordingly, it is often challenging to detect a data path between two nodes in a network. Furthermore, it is often challenging to perform the detection on a network-wide scale and in a computationally efficient manner.

BRIEF DESCRIPTION OF THE DRAWINGS

Various embodiments in accordance with the present disclosure will be described with reference to the drawings, in which.

DETAILED DESCRIPTION

Figure 1:
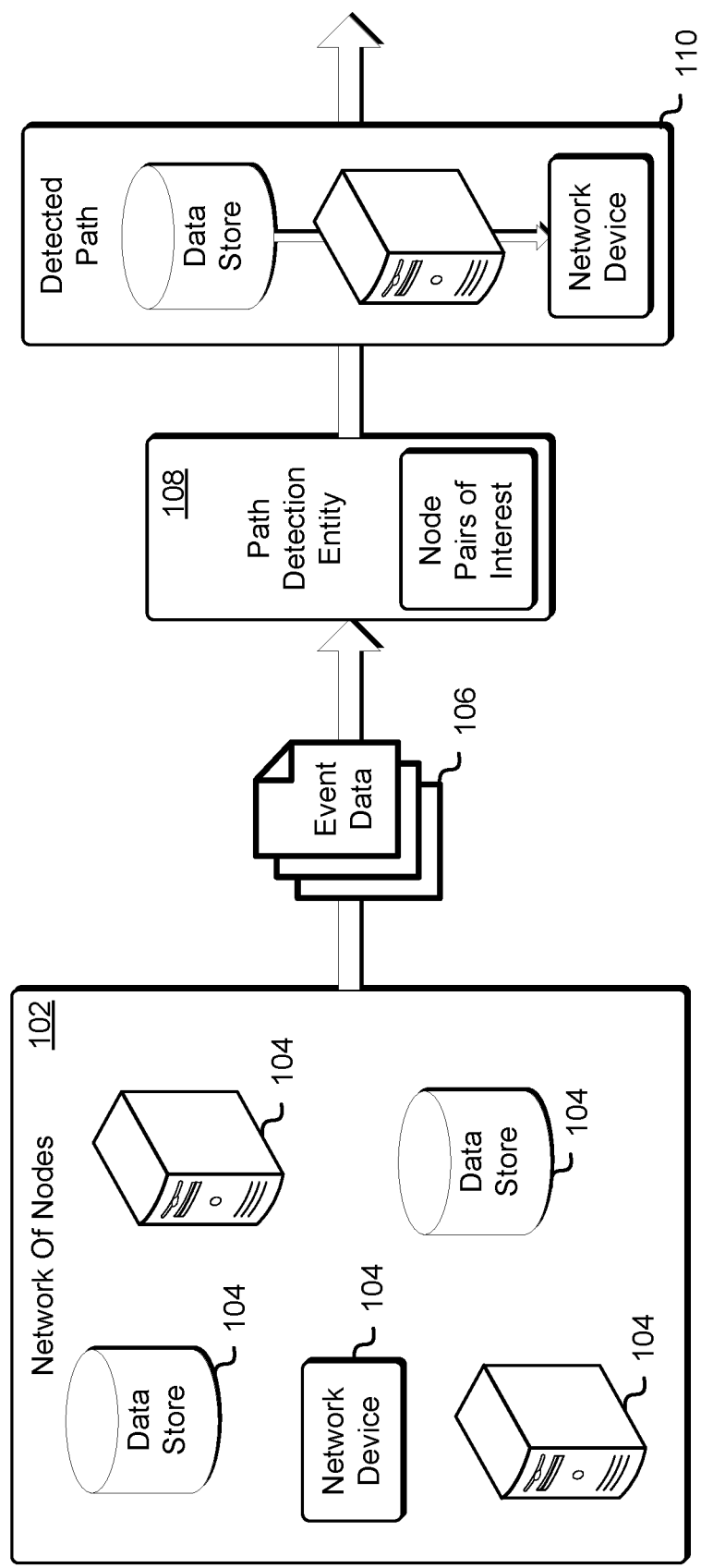
FIG. 1 shows an example of data path detection in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include detecting a data path in a network of nodes. A node, as described herein, may be any entity that is capable of receiving or sending data. The node may be a computer system, server or host, router, such as a border or gateway router, or a data store, among others. Furthermore, the node may be a physical or logical entity. For example, the node may be an optical disk drive of a computer system or a logical storage space that is instantiated using underlying physical hardware.

Any two nodes in the network may have a link between one another. As described herein, the two nodes may have a link if one node sends data to or receives data from the other node. Furthermore, two nodes may have a link if there is a likelihood or potential for one node to send data to or receive data from the other node. For example, two nodes may have a link if one node has permission to access the other node even if the access permission is not exercised or not yet utilized for sending or receiving data.

Information pertaining to a link between network nodes may be retained. For example, the information may be log data of the network that indicates that a data exchange between nodes has taken place. Further, the information may be access control information that specifies access permissions of network nodes. The information may be provided to a data path detection entity, which may be any computing resource that is configured detect that a path between two nodes is present due to the fact that the two nodes are linked either directly or indirectly via intermediary nodes. For example, the data path detection entity may be a computing device, computing system process, program, application, service, module or a combination of these and/or other such computing system entities. The data path detection entity may use the information to detect whether a path exists between any pair of nodes in the network.

For a given pair of nodes that are path-end nodes, the data path detection entity may assign any node in the network a proximity measure, which may be a distance, to both path-end nodes. The proximity measure may be the number of hops or the number of intermediary nodes between the node and a path-end node. Further, the proximity measure may be the sum of each hop as weighted by a set weight. The weight may, for example, be a function of an attribute of the hop. For example, if the hop exists because two nodes are able to access one another, the weight may be set to 1, whereas if the hop exists because two nodes are observed to exchange data, the weight may be set to 0.5, for example. As link information is received, the proximity measures are updated in accordance with the information. A path between the path-end nodes may be detected when a node has proximity measures to both path-end nodes that are within a specified range.

When a path is detected, a notification indicating the presence of the path may be provided and used for various purposes. For example, the presence of a path may be used to model a node outage or unavailability and used to determine the effect of a node becoming unavailable on existing data paths. Further, detected path information may be used to assess the effect of changes to an access permission of a node. For example, detected path information may be used to determine whether existing paths are affected if a node's were to have increased or reduced access permissions. Further, if one path-end node may potentially performed data exfiltration, the detected path to the path-end node may be used to determine whether certain data in the network is at risk of being provided to an external entity.

FIG. 1 shows an example of data path detection in accordance with at least one embodiment. A network 102 includes a plurality of nodes 104 (singularly referred to herein as node 104 and collectively referred to herein as nodes 104). The nodes 104 may be linked with one another due to a variety of factors. For example, the nodes 104 may exchange data with one another and may, accordingly be linked. Furthermore, a node 104 may have access privileges that permit the node 104 to access another node 104 within the network 102. Event data 106 for the nodes may be received by a path detection entity 108. The event data 106 may be based at least in part on activity that occurs within the network 102, such as connection establishment between nodes. Furthermore, the event data 106 may specify access permissions of the nodes 104, among other information. The event data 106 may be received by a path detection entity 108, which may be a computer system that is configured to receive the event data and, over time, track linkage between the nodes 104 and detect whether a path exists between the nodes 104.

The path detection entity 108 may determine a proximity measure between any two nodes 104 based at least in part on the event data 106, whereby the proximity measure may be weighed based at least in part on the event data. The two nodes 104 may represent a node pair of interest. The path detection entity 108 may be configured to track one or more node pairs of interest and determine whether a link exists between any node pair of the one or more node pairs of interest. For example, if the event data 106 indicates that two nodes 104 exchange data, their proximity measure may be more heavily weighted than if the event data 106 only indicates that a first node 104 has a permission to access a second node 104. As the event data 106 is received over time, the path detection entity 108 may update proximity measures between nodes 104. Upon certain conditions being met (such as a proximity measure being within a specified range), the path detection entity 108 provides an indication of a detected path 110 in the network 102.

Figure 2:
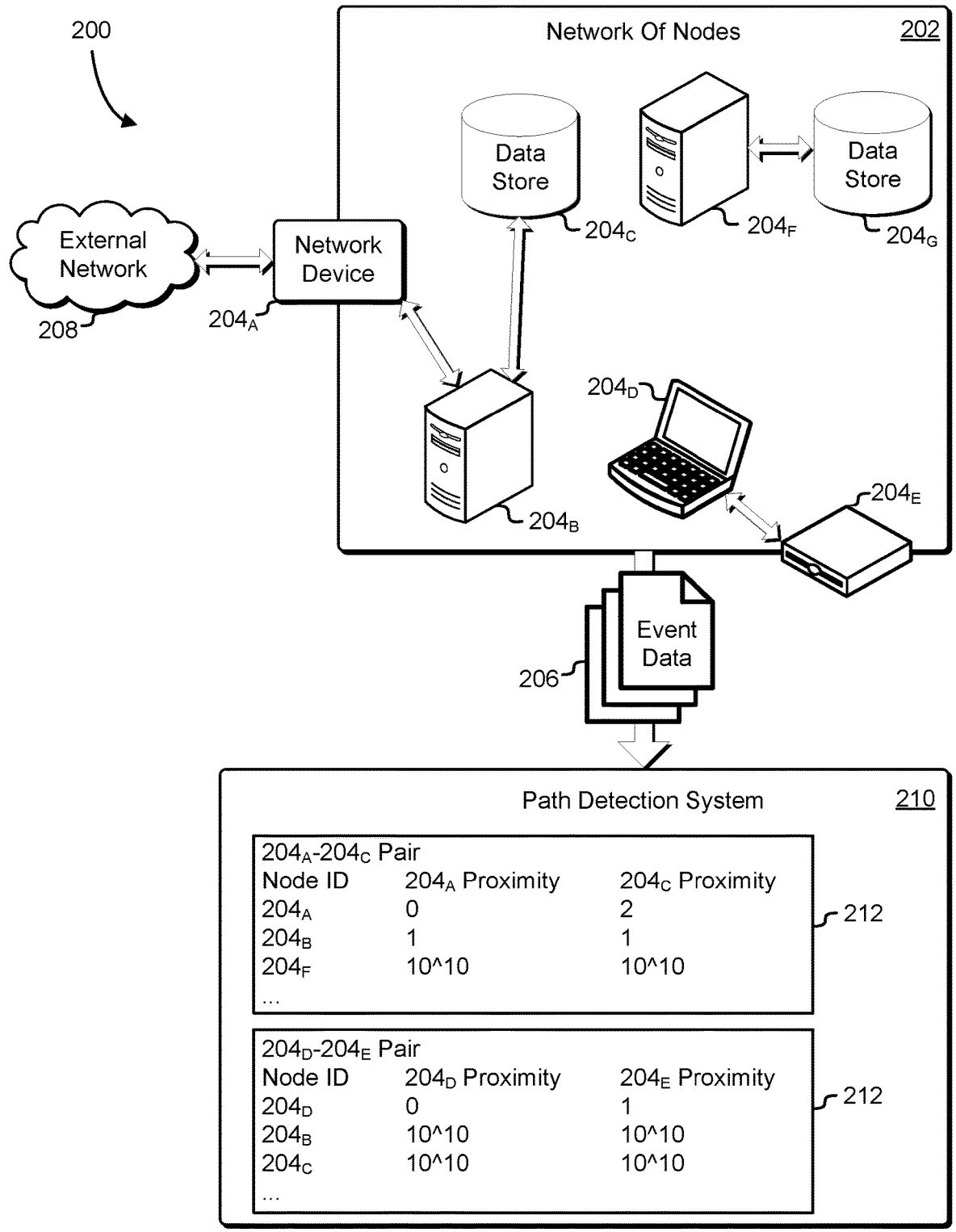
FIG. 2 shows an example of an environment in which data path detection is performed in accordance with at least one embodiment.

FIG. 2 shows an example of an environment in which data path detection is performed in accordance with at least one embodiment. The environment 200 includes a network of nodes 202 and a path detection system 210. The network of nodes 202 includes a plurality of nodes $204_{A-G}$ (singularly referred to herein as node 204 and collectively referred to herein after as nodes 204). A node 204 may be any type of device or entity that is capable of communicating with another node 204 in the network 202 or outside of the network 202. The node 204 may be a computer system, such as laptop computer, a desktop computer, a smartphone or tablet, a server or a network device, such as a router. Further, the node 204 may be a data store, such as a database or a storage service that is capable of storing block-level as well as object-level data. The node 204 may be an input/output device, such as a port, network socket. In various embodiments, the node 204 may be configurable by an application or an operating system. For example, the node may be a socket that has an address and is configured to receive or send data pertaining to an application. A computer system may include a plurality of nodes, whereby the storage drive of the computer system may be first node, an application being executed on the computer system may be a second node and an input/output device may be a third node. The node 204 may be a physical device, such as a physical server, a hard disk, hard drive or solid state drive. Furthermore, the node 204 may be a virtual computing system that is instantiated utilizing underlying physical computing resources.

Two or more nodes 204 of the network 202 may be linked with one another. Linked nodes 204 may be nodes that have a data path between one another, whereby a first node may send data to a second node or receive data from the second node. Linked nodes are also referred to herein as connected nodes, and node linking and node connectivity are used interchangeably. For example, a first node may serve as a data source and a second node may serve as a data sink. Nodes 204 may be linked if the flow of data between the nodes 204 is unidirectional or is bidirectional.

Further, two nodes may be linked and a data path may exist between the two nodes if a first node is permitted to send data to the second node or receive data from the second node even if the permission is not exercised or utilizes for access. Access permissions may be associated with nodes 204 in the network 202, and an entity within the network 202 may be tasked with enforcing the access permissions. The access permissions may correspond to access privileges that specify a level of access enforced within the network. For example, the network 202 may be access-controlled and nodes 204 of the network 202 may have permission privileges that specify a type of access that may be granted to a node 204. One or more nodes 204 may be members of a group, whereby the group may be associated with a certain access permission that enables each node in the group to access a specific node 204. A data path may exist between two nodes if there is a likelihood or potential for a unidirectional or bidirectional data exchange between the two nodes.

It may not be required that the nodes 204 of the network 202 be all connected with one another (for example, to form a complete connectivity graph) or with another node outside the network 202. The network 202 may have one or more graphs, whereby each graph may indicate the connectivity between the nodes. As shown in FIG. 2, a first graph of the network 202 may be the connectivity between nodes $204_A$, $204_B$ and $204_C$, whereas a second graph of the network 202 may be the connectivity between nodes $204_F$ and $204_G$.

For the purposes of data path mapping and detection, the nodes 204 of the network 202 may be classified into two categories. The first category may comprise path-end nodes, whereas the second category may comprise intermediary nodes. A path-end node may be designated as such due at least in part to the fact that the path-end node may facilitate data to be sent to an entity outside the network 202 or due to a suspicion that the path-end node facilitates data to be sent outside the network 202. A path-end node may also be designated as such based at least in part on one or more attributes associated with the path-end node. The attributes may include accessibility by an entity outside the network 202 or an unauthenticated entity or capability to vend data to an external network 208 or external node, among others. Conversely, a path-end node may be a node that vends data within the network 202. For example, a database that retains data (such as, critical, sensitive or secretive data) and provides the data for use may be a path-end node. Further, a computer system that supplies data to one or more nodes may be a path-end node. Typically, a path-end node may be any node of for which it may be sought to determine a data path terminating at the path-end node.

As shown in FIG. 2, nodes $204_A$, $204_C$ may be deemed as path-end nodes due at least in part to the fact that data provided by the data store node $204_C$ may be transmitted outside the network 202 by the network device node $204_A$. Furthermore, nodes $204_D$, $204_E$ may be designated as path-end nodes due at least in part to the fact that data retained by the computer system node $204_D$ may be written to a disk by the optical disk drive node $204_E$.

An intermediary node, such as any one of nodes $204_B$, $204_F$ and $204_G$, may be any node other than a path-end node. The intermediary node may reside on a data path of path-end nodes, whereby the intermediary node facilitates a data exchange between the path-end nodes by, for example, sending data received from a first path-end node (or another intermediary node) to a second path-end node (or another intermediary node) or vice-versa. Further, the intermediary node may not reside on a data path of a path-end node, however, the intermediary node may be tracked and the intermediary node's associated data links may evaluated in the event that the role of the intermediary node changes so as to reside on the path.

As shown in FIG. 2, computer system node $204_B$ may be an intermediary node due at least in part to the fact that the computer system node $204_B$ sits on the data path between path-end nodes $204_A$, $204_C$. Further, computer system node $204_F$ and data store node $204_G$ are intermediary nodes even though the computer system node $204_F$ and the data store node $204_G$ are not resident on a data path of path-end nodes. As the network connectivity changes and new links are established, the computer system node $204_F$ and the data store node $204_G$ may reside on the data path.

Event data 206 pertaining to the nodes 204 of the network 202 may be provided to a path detection system 210. The event data 206 may include log data of events that occur in or outside the network 202 or any type of record of an activity that occurred within the network 202. The event data 206 may also include information regarding an access permission of a node 204.

The path detection system 210 may be a collection of computing resources and/or other resources collectively configured to receive event data or other information and determine or update a proximity measure for a node based at least in part on the event data or other information. As used herein, unless otherwise stated or clear from context, the collection of computing resources may be a computer system program, process, client, server, service, application, module, operating system entity, controlling domain or combinations of these and/or other such computer system entities. The collection of computing resources may be a client and/or a server and in some embodiments may be configured to send and/or receive communications, data, requests and/or other such requests to and/or from other services within the computer system.

The log data may indicate that two nodes exchanged data or that a node established a connection with another node. For example, if a node made a function call to another node requesting data and the data was provided to the requesting node, the log data may reflect that the function call was made or that data was provided, whereby the function call may be an application programming interface (API) configured function call. The log data may indicate any events associated with linkage of nodes 204 within the network 202.

The event data 206 may also indicate a potential for a link between two nodes 204 or a likelihood of the two nodes 204 to be linked. The event data 206 may include access permission information for a node 204, which may be based at least in part on access privileges for the node. For example, if a first node has permission to access a second node, the event data 206 may reflect the access even if the access permission was not used for accessing the second node.

The path detection system 210 may utilize the event data 206 to update retained data path graph data 212 and determine based at least in part on the data path graph data 212 whether data path exists between any two nodes 204 (for example, any two path-end nodes). For at least a pair of nodes, the data path graph data 212 may indicate whether a data path exists between the two nodes, whereby the data path may be facilitated by the pair of nodes or a third node in the network 202. A proximity metric may be used for determining a measure of proximity between the two nodes 204.

For nodes $204_A$, $204_C$, the data path graph data 212 is based at least in part on a proximity metric that assigns a proximity measure of one to each link of a path and a proximity measure of zero if a path between two nodes does not exist. Initially, each of the path-end nodes $204_A$, $204_C$ has a proximity measure of zero to itself and a proximity measure having a high value that may theoretically be infinity but practically be set to $10^{10}$. Further, nodes that are not path-end nodes for the path of interest, may initially have a proximity measure to the path-end nodes that is set to the high value. Based at least in part on a continuous stream of event data, the proximity measures of all tracked nodes are updated, whereby the stream of event data may be provided serially to the path detection system. At a point in time, a path is detected between the two path-end nodes if a tracked node has a proximity measure, to both path-end nodes, that is less than the set maximum value of $10^{10}$. Accordingly, as shown in FIG. 2, a data path is detected between nodes $204_A$, $204_C$ when node $204_A$ has a proximity measure of 0 to itself and a proximity measure of 2 to node $204_C$ or when node $204_B$ has a proximity measure of 1 to node $204_A$ and a proximity measure of 1 to node $204_C$. Similarly a data path may be detected between nodes $204_D$, $204_E$. A hash table may be utilize for indexing the nodes identities and retaining tracked proximity measures.

It is noted that although an example of a proximity metric is provided with reference in FIG. 2, a proximity metric may be defined in various ways. For example, the proximity metric may be dependent upon one or more factors, such as a potential for a link to exist between two nodes or an access privilege of a node. Additionally, the proximity metric may be based at least in part on an indication of an amount of data that is exchanged (uni-directionally or bi-directionally) between the two nodes or a likelihood or potential for the data to be exchanged. The proximity metric may be weighed based at least in part on these factors.

The path detection system 210 may utilize a property graph to store information or metadata associated with the nodes or the links or connections of the nodes. The stored information or metadata may specify attributes associated with path-end nodes (or vertices) as well as intermediary nodes that may be resident on a path linking path end nodes. For example, in addition to or instead of the proximity measures that may be retained for a node, the property graph may include contextual information for a node or the node's connections. The contextual information may include attributes of the node's links or attributes of event data for the node. The contextual information may be stored within the property graph or as metadata that is associated with the property graph.

Figure 3:
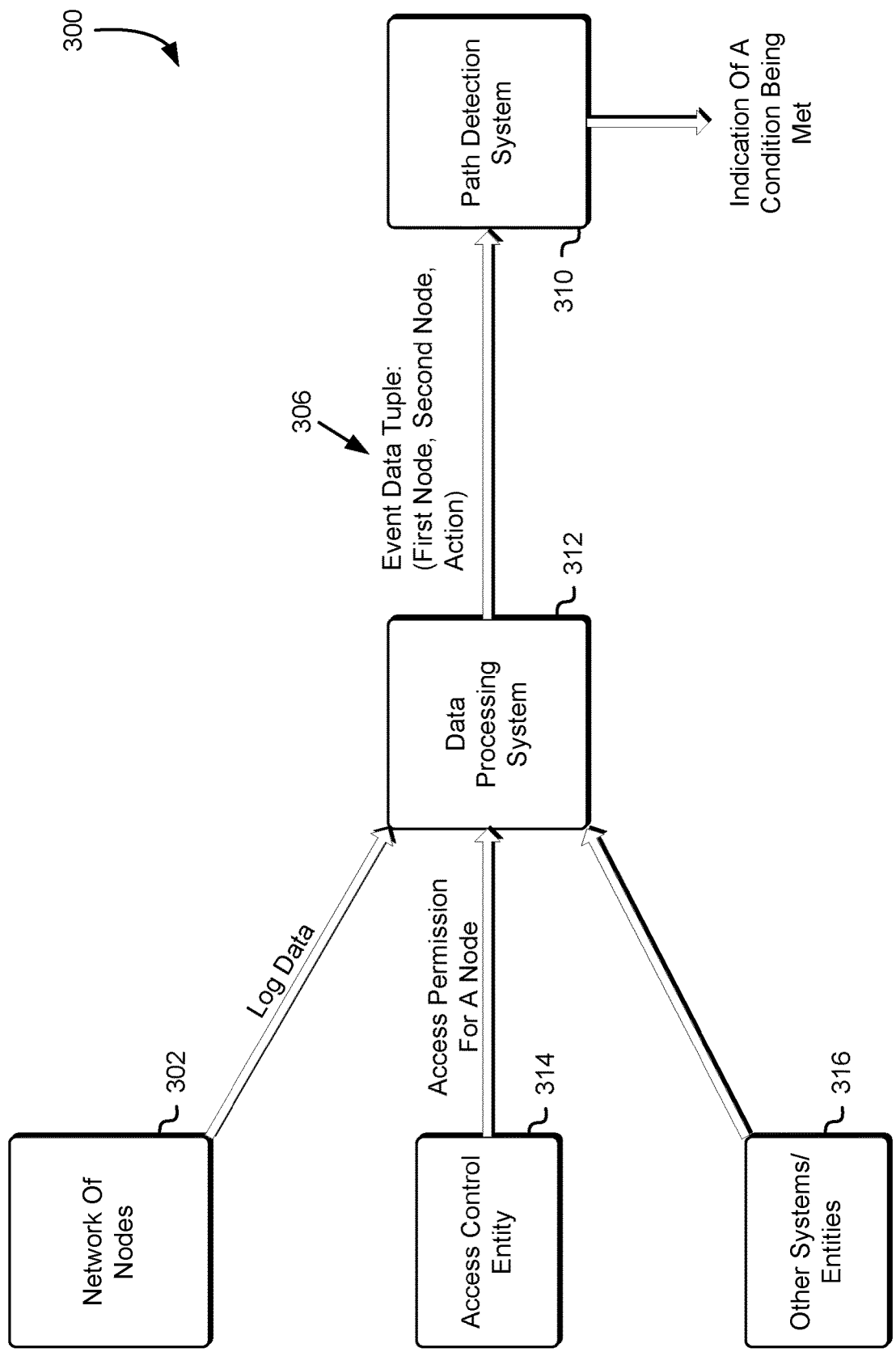
FIG. 3 shows an example of an environment for data path detection in accordance with at least one embodiment.

FIG. 3 shows an example of an environment for data path detection in accordance with at least one embodiment. The environment 300 includes a path detection system 310, data processing system 312, network of nodes 302, access control entity 314 and one or more other entities or systems 316. The path detection system 310 may be similar to the path detection system described with reference to numeral 210 in FIG. 2 and may be configured to receive an event data tuple 306 from the data processing system 312 and update proximity measures for one or more nodes based at least in part on the event data tuple 306. The path detection system 310 may be further configured to receive one or more criteria associated with calculated proximity measures, whereby the one or more criteria may specify one or more conditions upon the satisfaction of which the path detection system 310 provides an indication or an alarm to an entity. The conditions may be placed on a retained proximity measure and may be designed so as to be satisfied upon the establishment of a data path between two nodes.

The data processing system 312 may be a collection of computing resources and/or other resources collectively configured to receive log data information, access permission information or other information associated with one or more nodes and generate an event data tuple 306 based at least in part on the received information. As used herein, unless otherwise stated or clear from context, the collection of computing resources may be a computer system program, process, client, server, service, application, module, operating system entity, controlling domain or combinations of these and/or other such computer system entities. The collection of computing resources may be a client and/or a server and in some embodiments may be configured to send and/or receive communications, data, requests and/or other such requests to and/or from other services within the computer system.

The data processing system 312 may receive the log data from a network of nodes 302 as described herein. The log data may be a report of activity that occurs in the network of nodes 302. The log data may include information regarding connection establishment between nodes, an exchange of data between nodes or a volume of exchanged data, among others. As used herein a data exchange may refer to a unidirectional or bidirectional exchange.

The data processing system 312 may be configured to receive aggregated log data and normalize the data to produce event data to be provided to the path detection system 310. Normalizing the data may include evaluating the data and capturing the data (for example, by summarizing the data) in an event data tuple. For the purposes of path detection, of primary interest in the received log data may be the identities of two parties to a connection and the nature of the connection. Additional information that may not be as useful for path detection may not be relayed to the data processing system 312. The data processing system 312 may be configured with various action types that it may provide to the path detection system 310. The action types may include bidirectional link, unidirectional link or a volume of data exchanged between nodes exceeding a threshold or being below a threshold, among others. The data processing system 312 may evaluate log data and determine whether the log data includes an indication to a type of action with which the data processing system 312 is configured. If a positive determination is made, the data processing system 312 may provide the path detection system 310 with an event data tuple in accordance with the log data.

The data processing system 312 also receive access permission information for a node from the access control entity 314. The access control entity 314 may be a collection of computing resources or other resources collectively configured to retain information associated with the access permissions of one or more nodes or control access to one or more nodes within the network 302 in accordance with the access permissions. An access permission may be based at least in part on an access privilege of a node, whereby the access privilege may grant the node access to one or more nodes. Further, the access permission may be based at least in part on the node being a member of a group having an access capability.

Similar to the log data, the data processing system 312 may synthesize an event data tuple 306 based at least in part on the received access permission for a node. If the access permission of a first node permits the first node to receive data having a certain category from a second node, the data processing system 312 may generate an event data tuple 306 based at least in part on the access permission, whereby the tuple may identify the node as well as an action. The action may be that the first node is permitted to receive the data. The data processing system 312 may be configured with various action types and may process received access permission information to determine an appropriate action type to specify in the tuple. The action types may include access permission to data categorized as sensitive or access permission to data categorized as not sensitive, among others. An action type may model a severity associated with an existing or potential link between two nodes. For example, if an access permission of a first node gives the first node an open-ended permission to read from or write data to a second node, the action may be categorized differently than a permission to make certain types of function calls that only retrieve data that is not sensitive. The data processing system 312 may also receive information from other systems or entities 316 and synthesize an event data tuple 306 based at least in part on the information.

Figure 4:
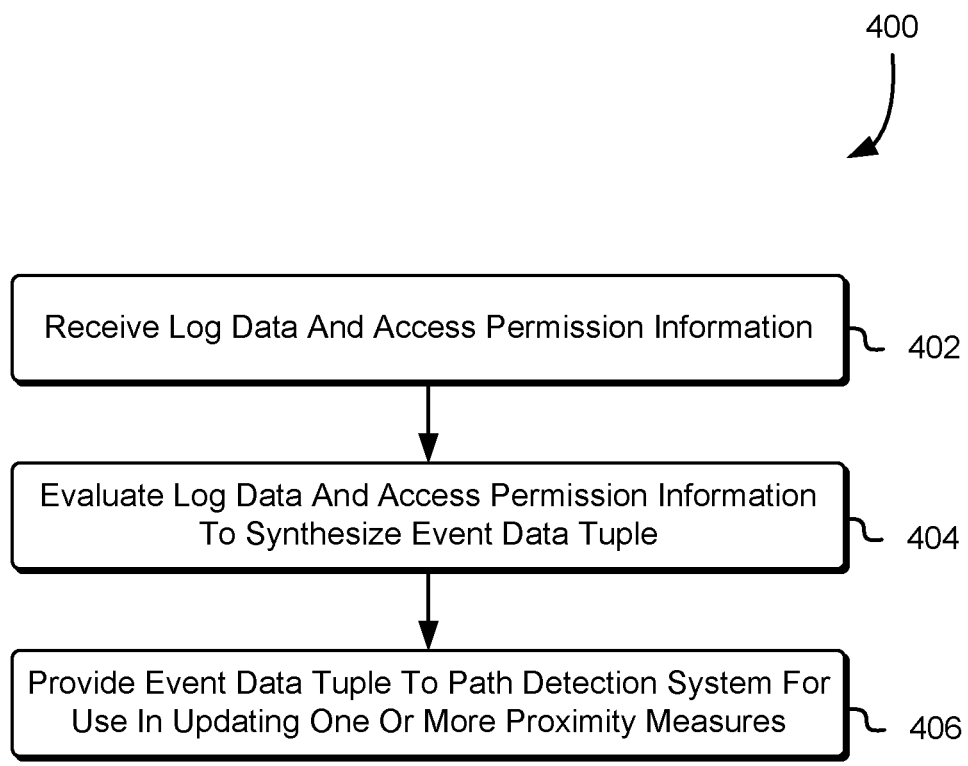
FIG. 4 shows an example of a method for event data tuple generation in accordance with at least one embodiment.

FIG. 4 shows an example of a method for event data tuple generation in accordance with at least one embodiment. In the process 400, a data processing system, such as the data processing system described with reference to numeral 310 in FIG. 3 receives 402 log data and access permission information. As described herein, the log data may pertain to activity of a network of nodes and the access permission information may be received from an access control entity. The data processing system then evaluates 404 the log data and the access permission information to synthesize an event data tuple.

The event data tuple may include an identity associated with two or more nodes and a type of action pertaining to the nodes that may be ascertained based at least in part on the log data and the access permission information. The action may indicate that a link exists between the two nodes or that one node has a permission to access the other node, among others. Further, other information may be received and used in synthesizing an event data tuple as described herein. The data processing system then provides 406 the event data tuple to a path detection system for use in updating one or more proximity measures.

Figure 5:
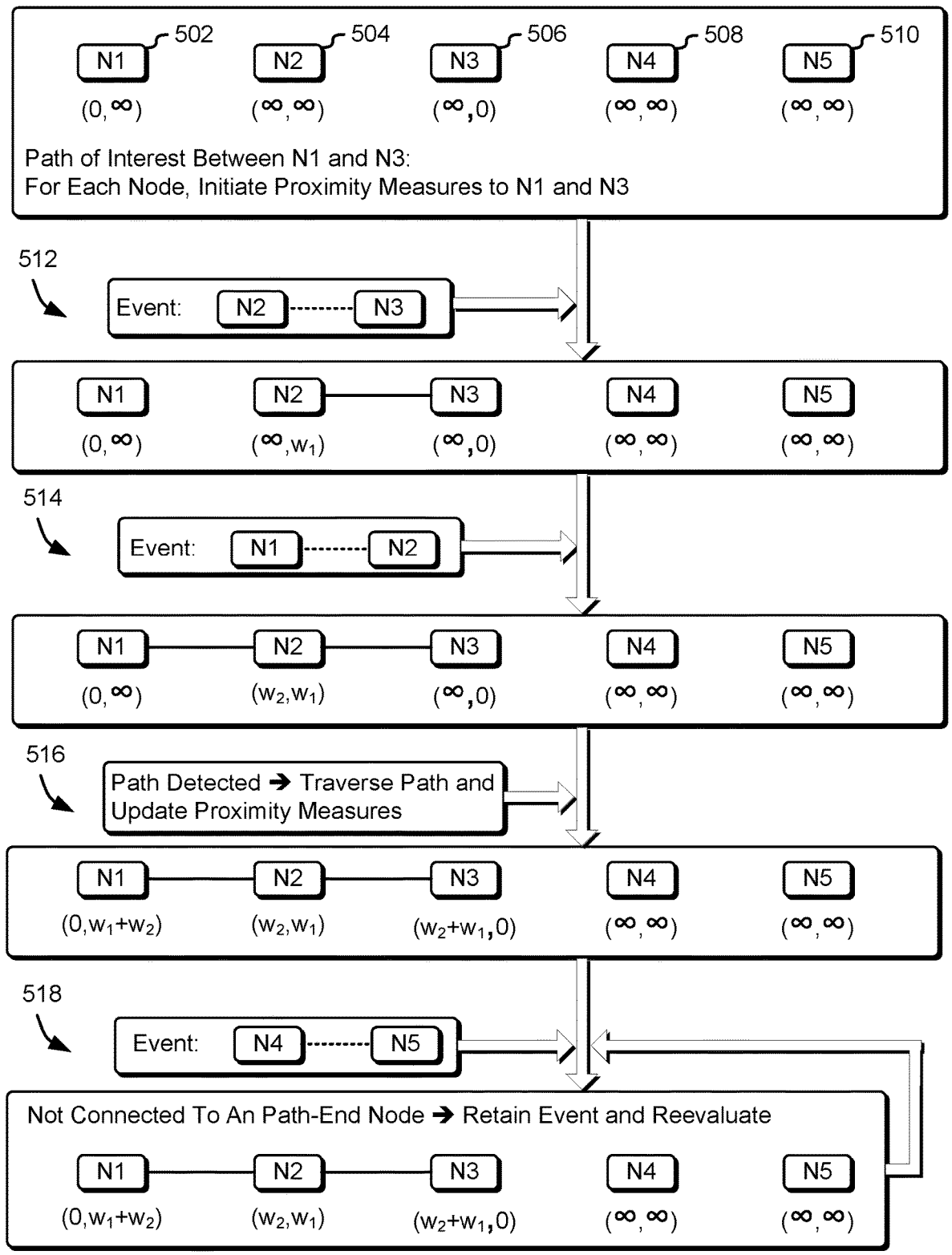
FIG. 5 shows an example of path detection and proximity measure determination in accordance with at least on embodiment.

FIG. 5 shows an example of path detection and proximity measure determination in accordance with at least on embodiment. Five nodes are shown in FIG. 5 and designated as nodes N1-N5 502-510. A path of interest between node N1 502 and node N3 506 is sought to be determined, whereby node N1 502 and node N3 506 may be path-end nodes. For each node 502-510, a proximity measure to node N1 502 and node N3 506 is initiated. Because nodes N2, N4 and N5 502, 508, 510 do not have a link with node N1 502 and node N3 506 their proximity measures to node N1 502 and node N3 506 are set to ∞, which may practically be set to a high value, such as $10^{10}$. Similarly, node N1's 502 proximity measure to node N1 502 may be set to zero and to node N3 506 may be set to the high value and node N3's 506 proximity measure to itself may be set to zero and to node N1 502 may be set to the high value. In FIG. 5, the proximity measure of each node N1-N5 502-510 is denoted compactly as (proximity measure to node N1 502, proximity measure to node N3 506).

Following initiation, received event data tuples may be used to update the proximity measures. At 512, an event data tuple is received indicating a link between node N2 504 and node N3 506. As described herein, the event may indicate that data was exchange between node N2 504 and node N3 506 or that an access permission of node N2 504 permits node N2 504 access to node N3 506, among others. Each event may correspond to a proximity measure between the nodes. The proximity measure may be based at least in part on an attribute of the event, whereby the attribute may be a severity of the event or an effect of the event on data exchanged between the nodes. For example, a first event indicating that a node has complete access to data retained by another node may have an associated proximity measure that is less than a second event indicating that the node has access to data that is categorized as non-critical. For example, the distance metric for the first event may be w=0.4, whereas the distance metric for the second event may be w=2. In some embodiments, all events indicating a link between nodes may be associated with a unified or normalized weight, such as w=1.

As shown in FIG. 5, the received event has a weight of $w_1$, and, accordingly, the proximity measure between node N2 504 and node N3 506 becomes $w_1$. At 514, a second event is received indicating a link between node N1 502 and node N2 504. The event may have an associated weight of $w_2$. Accordingly, the proximity measure of node N2 504 to node N1 502 may be updated to become $w_2$. The tracked proximity measure of node N2 504 to either path-end nodes becomes non-infinite or less than the preset high value. Upon this condition being met, a path between the path-end nodes (N1 502 and node N3 506) is detected to exist. Following detecting the path, the path is traversed at 516 and the proximity measures of every node on the path to either path-end nodes is updated.

At 518, an event is received pertaining to node N4 508 and node N5 510. Node N4 508 and node N5 510 are not linked to either path-end node. Further, the event does not cause node N4 508 or node N5 510 to become linked to either path-end node. A link may be a direct link to a path-end node or an indirect link (for example, involving one or more intermediary nodes). Due to at least in part to the fact node N4 508 or node N5 510 are not linked to either path-end node and the event does not cause node N4 508 or node N5 510 to become linked to either path-end node, the event may not yet be used to updated a proximity measure of node N4 508 or node N5 510 to either path-end node. Accordingly, the event may be retained and subsequently reevaluated when connectivity conditions cause node N4 508 or node N5 510 to be linked to either path-end node.

The weights (for example, $w_1$ and $w_2$) associated with received events may be defined based at least in part on metadata associated with an event. For example, a scoring mechanism may be used to define the weights. A weight may be dependent on a classification or a type of exchanged data or a volume of exchanged data, among others.

Figure 6:
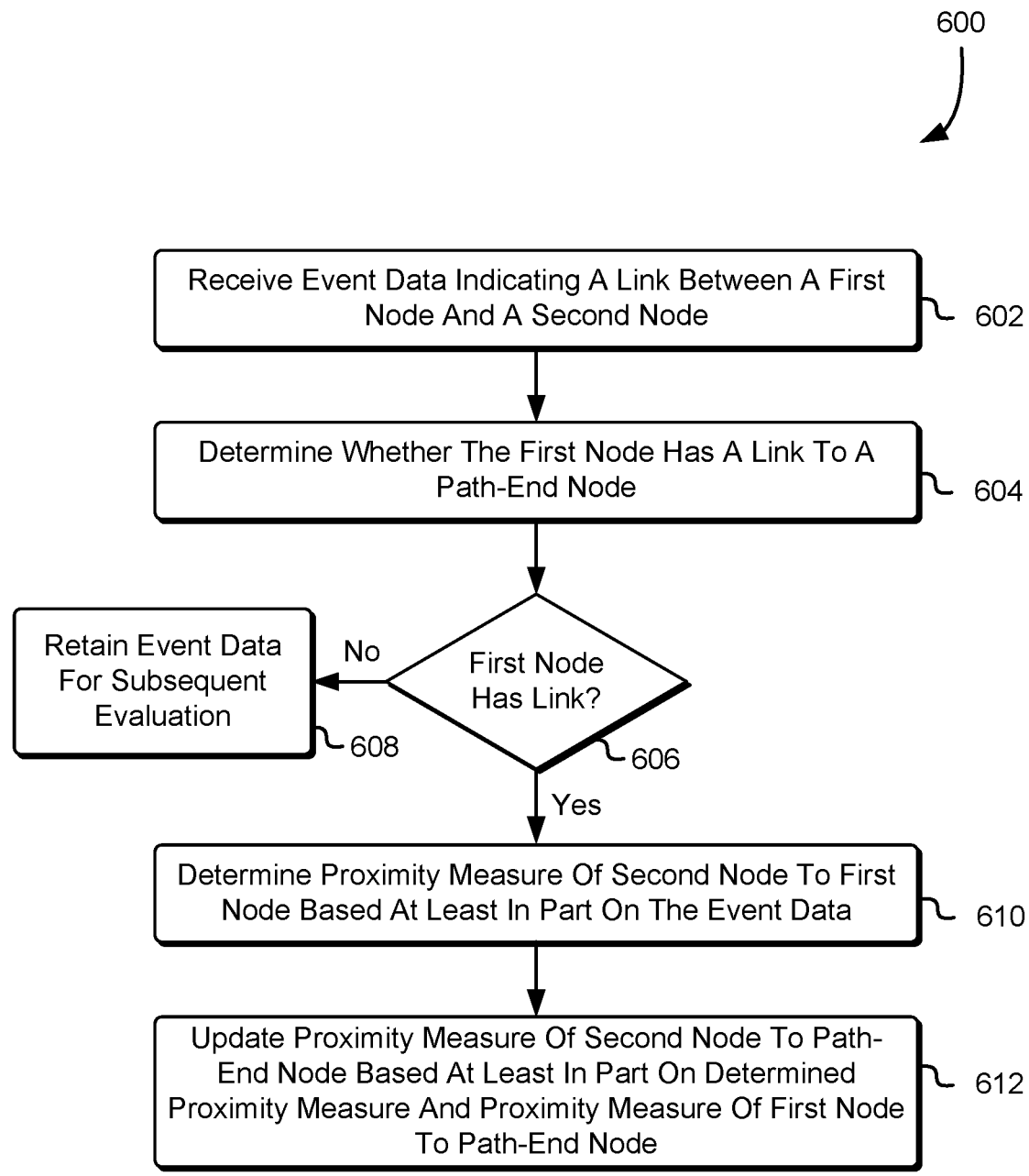
FIG. 6 shows an example of a method for updating proximity metrics in accordance with at least one embodiment.

FIG. 6 shows an example of a method for updating proximity metrics in accordance with at least one embodiment. In the process 600, a path detection system, such as the path detection system described with reference to numeral 310 in FIG. 3, receives 602 event data indicating a link between a first node and a second node. The path detection system determines 604 whether the first node has a link to a path-end node, whereby the first node may be any node of the two nodes to which the event data pertains. If the determination 606 is negative, the path detection system retains 608 the event data for subsequent evaluation. Because neither node has a path to a path-end node, the proximity measure of a node to a path-end node may not be updated based at least in part on the received event data. Accordingly, the event data may be retained and subsequently evaluated when at least one node has a link to a path-end node, whereby if the at least one node has the link, the proximity measure of the other node of the pair may be updated based at least in part on the event data.

If a positive determination 606 is made that the first node has a link to a path-end node, the path detection system determines 610 a proximity measure of the second node to the first node based at least in part on the received event data. The path detection system then updates 612 updates the proximity measure of the second node to the path-end node based at least in part on the determined proximity measure and the proximity measure of first node to path-end node. For example, the two proximity measures may be added to arrive at the proximity measure of the second node to the path-end node.

Figure 7:
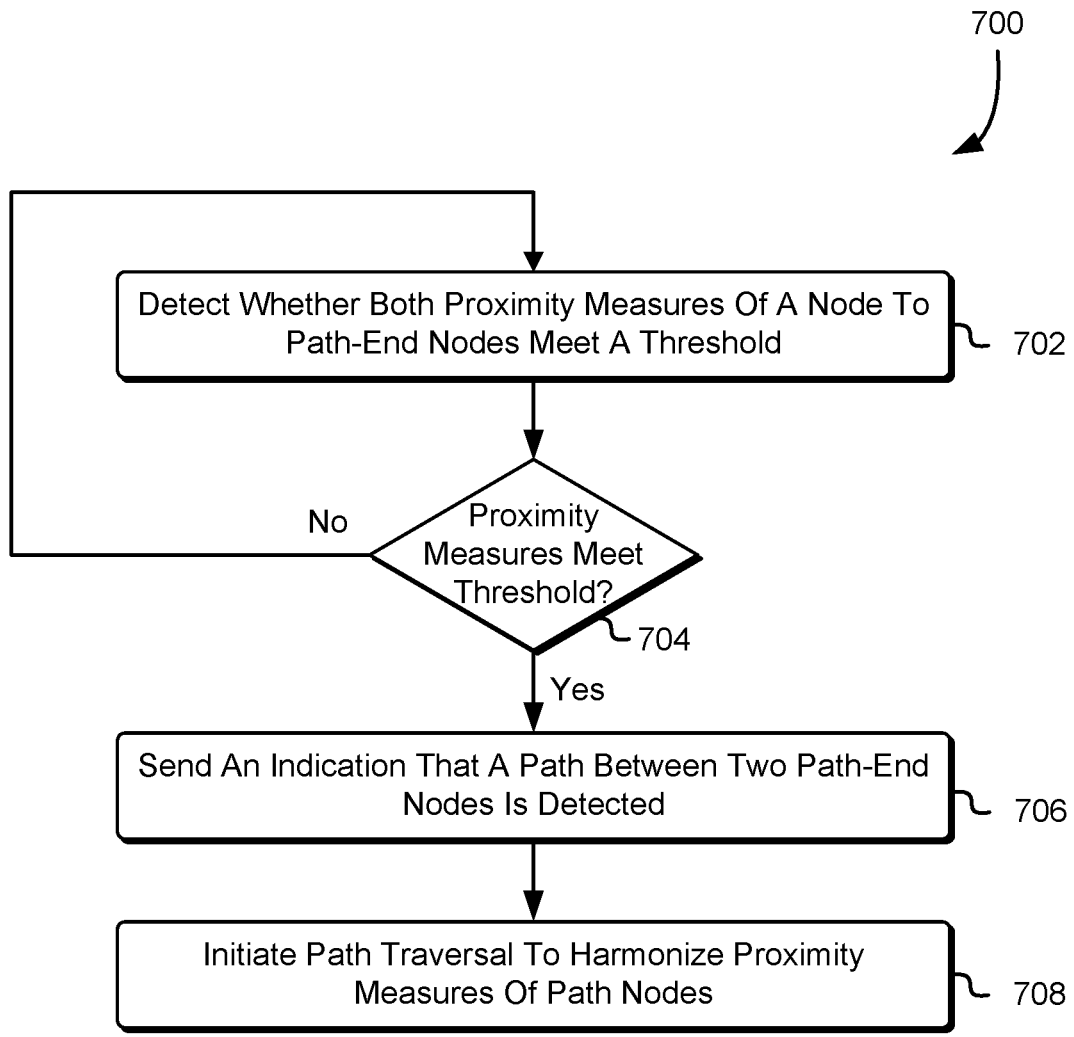
FIG. 7 shows an example of a method for detecting a path between two path-end nodes in accordance with at least one embodiment.

FIG. 7 shows an example of a method for detecting a path between two path-end nodes in accordance with at least one embodiment. In the process 700, a path detection system, such as the path detection system described with reference to numeral 310 in FIG. 3, detects 702 whether both proximity measures of a node to path-end nodes meet a threshold. As described herein, the node may reside on a potential path between the two path-end nodes. Further, the threshold may be the high value set to indicate an absence of a link between two nodes, whereby a proximity measure may meet the threshold is the proximity measure is below the threshold. The detection may be performed periodically or according to a schedule. Further, the detection may be performed when a proximity measure for a node is updated.

If it is determined 704 that both proximity measure meet the threshold, the path detection system sends 706 an indication that a path between the two path-end nodes is detected. The indication may be provided to any party, such as a system that is responsible for tracking potential egress of data from the network. Further, the indication may be provided to an access control system that uses the detected data paths to evaluate permission privileges of nodes. For example, the access control system may deny certain privileges to a node if a node resides on a path to a path-end node. Further, the path information may be used to model impacts of a access permission change in the network and identify potential new paths that may be established based at least in part on an access permission change. Path information may be used to identify whether undesirable configurations are present in a network. For example, for a path, a policy may specify certain nodes may not be linked to the path. Accordingly, the path information may be used to identify nodes present on the path and take appropriate actions to keep evaluate from establishing a link to the path.

The path detection system also initiates 708 path traversal to harmonize proximity measures of path nodes. As described herein, once a path is detected, the path may be traversed and the proximity measure of nodes on the path may be updated. The proximity between two path-end nodes may be calculated as the sum of the proximity measure to a first path-end node and the proximity measure to a second path-end node. The sum may be equal for each node on the path and to calculate the proximity the proximity measures may be required to be summed for only one node on the path between the two path-end nodes.

A first detected path having a smaller measured proximity between its two path-end nodes than a second detected path may more conveniently facilitate the exchange of data. From a security perspective such path may present more risk for data egress from a network. Further, in some networks, data paths may be required to pass a set of infrastructure, whereby the requirement may necessitate a minimum proximity measure between path-end nodes. If the measured proximity drops below the minimum, it may be implicated that the set of infrastructure is being circumvented. The risk associated with a data path may increase as the measured proximity of the path decreases. For example, if a measured proximity for a path terminating at an Internet border router is small, the path may be deemed to be risky due to the fact that the path may be used to for the exfiltration of data to the Internet.

It is noted data path detection based at least in part on event data as described herein may be more computationally efficient than traversal-based path detection and may be performed in real-time as opposed to traversal-based path detection, which may only be performed after all event data has been collected.

The proximity measures provided by the path detection system may be used to determine the impact of outages on data paths. For example, if a node were to become unavailable, retained proximity measures may be used to determine whether data paths in a network will be affected. Further, note availability may be used to determine a proximity weight of a node. For example, a node may be known to be unavailable and information indicating the unavailability of the nodes may be received by the path detection system. A proximity measure of the node to neighboring nodes may be updated in accordance with a weight, whereby the weight may be set to a high value to indicate that the node is not available.

As described herein, path information may be used to vet the impact of policy changed. For example, if a node is a firewall entity or a border router of a network, the proximity measures of the firewall entity or the border router may be used to determine whether changing the permissions associated with the firewall entity or the border router will impact existing data path or potentially create new data paths.

Figure 8:
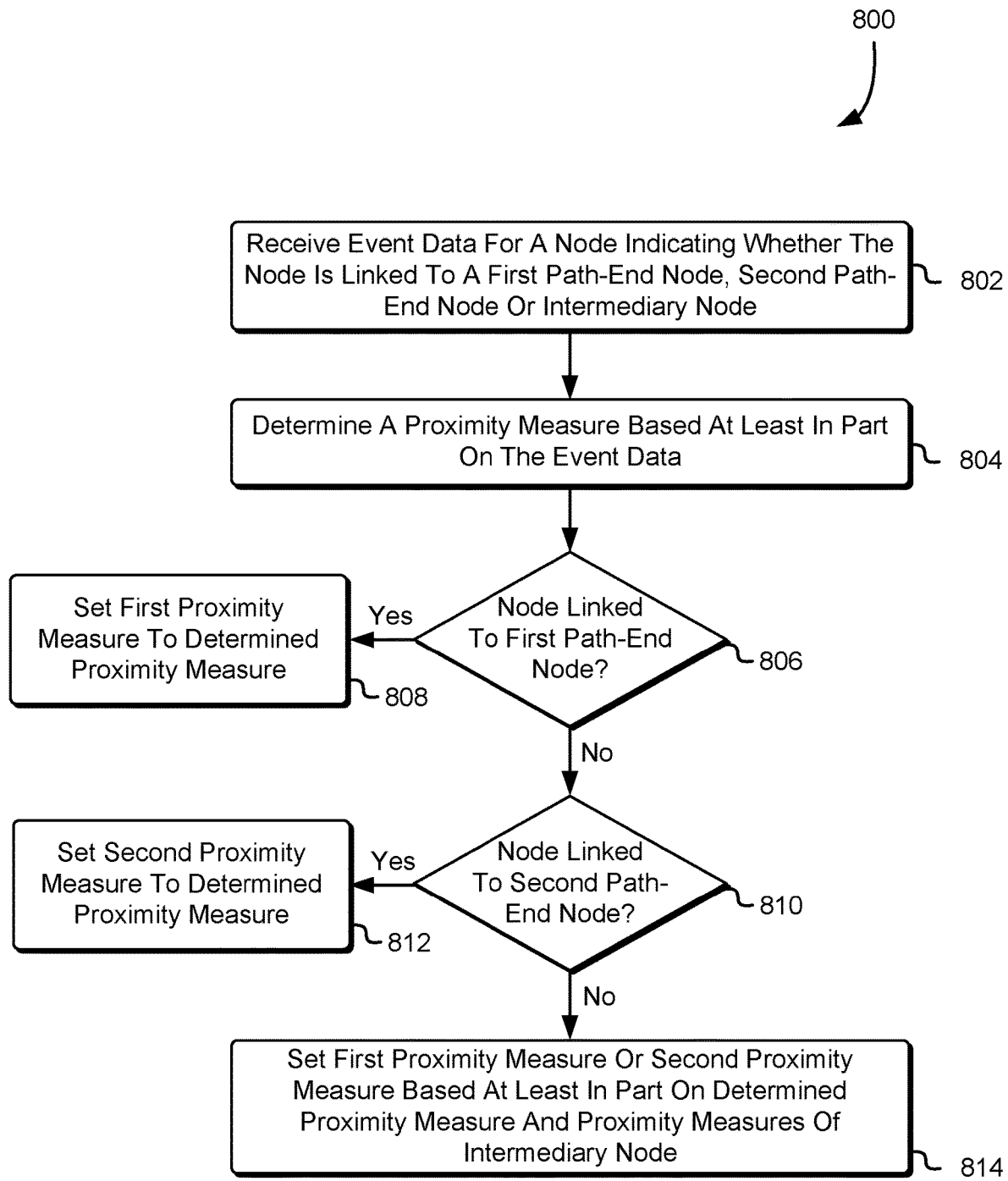
FIG. 8 shows an example of a method for setting a first proximity measure of a node and a second proximity measure of the node in accordance with at least one embodiment.

FIG. 8 shows an example of a method for setting a first proximity measure of a node and a second proximity measure of the node in accordance with at least one embodiment. The node has a first proximity measure to a first path-end node and a second proximity measure to a second path-end node. In the process 800, a path detection system, such as the path detection system described with reference to numeral 310 in FIG. 3, receives 802 event data for the node, whereby the event data indicates whether the node is linked to a first path-end node, a second path-end node or an intermediary node. The path detection system determines 804 a proximity measure based at least in part on the event data as described herein. The path detection system then determines 806 whether the event data indicates that the node is connected to the first path-end node. If a positive determination is made, the path detection system sets 808 the first proximity measure of the node to the proximity measure determined based at least in part on the received event data.

If a negative determination is made 806, the path detection system then determines 810 whether the event data indicates that the node is connected to the second path-end node. If a positive determination is made, the path detection system sets 812 the second proximity measure of the node to the proximity measure determined based at least in part on the received event data. If a negative determination is made 810, then it may be determined that the event data indicates that the node is linked to the intermediary node. The path detection system sets 814 the first proximity measure of the node or second proximity measure of the node based at least in part on determined proximity measure and the proximity measures of intermediary node.

To do so, the path detection system sets the first proximity measure to a first aggregate of the determined proximity measure and a proximity measure of the intermediary node to the first path-end node if the proximity measure of the intermediary node to the first path-end node is less than the first aggregate. Alternatively, the path detection system sets the second proximity measure of the node to a second aggregate of the determined proximity measure and a proximity measure of the intermediary node to the second path-end node if the proximity measure of the intermediary node to the second path-end node is less than the second aggregate.

In an embodiment, routing decisions in a network may be made based at least in part on a detected path. For example, data may be routed to or away from nodes that reside on a path depending on whether the path is suspected of being used for data exfiltration. If a path is associated with a likelihood of data exfiltration, sensitive data may be routed away from path nodes. In other embodiments, detected data paths in a network may be used to assess a risk associated with changing or establishing links in the network. Path detection based at least in part on log data may be used to detect paths that are in use in the network, whereas path detection based at least in part on access permissions may be used to detect paths that may potentially be used in the network or that are configured in the network even if the paths are not used.

Figure 9:
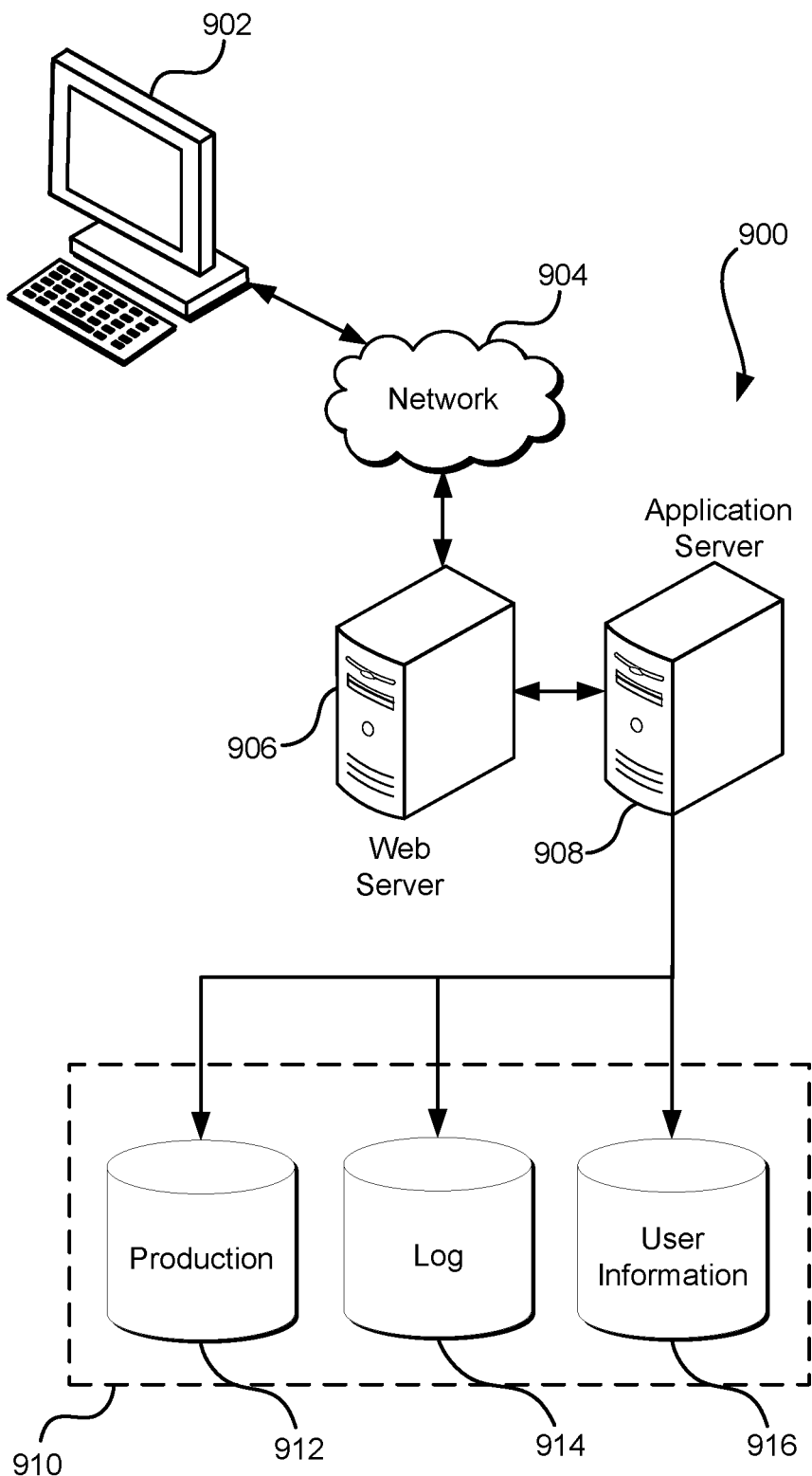
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information.

The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving data, in a data processing system, and involving a first node and a second node in a network, the data indicating at least a permission of the second node to access data managed by the first node;
   updating, based at least in part on the permission, a first proximity measure between the first node and the second node to result in an updated first proximity measure;
   determining, based at least in part on the updated first proximity measure and a second proximity measure between the second node and a third node, whether a data path exists between a data source and a data sink, wherein the third node is different from the first node and the second node; and
   indicating whether the data path exists between the data source and the data sink.

2. The computer-implemented method of claim 1, wherein the first node is the data source and the third node is the data sink.

3. The computer-implemented method of claim 1, wherein the first node is the data sink and the third node is the data source.

4. The computer-implemented method of claim 1, wherein the first node and second node are both different from the data source and data sink.

5. The computer-implemented method of claim 1, wherein the data comprises network log entries.

6. The computer-implemented method of claim 1, wherein the data comprises a record that indicates the permission, wherein the first node manages a database and the permission indicates that the second node may access the database managed by the first node.

7. The computer-implemented method of claim 1, wherein the first node and the second node are services in the network.

8. A system comprising:
   at least one computing device that implements one or more services, wherein the one or more services:
   for a node pair including a first node and a second node in a network, receive data indicating at least a permission of the first node to access data managed by the second node;
   update a first proximity measure associated with first node based at least in part on the data to result in an updated first proximity measure; and
   detect a path between a data source and a data sink based at least in part on the updated first proximity measure and a second proximity measure associated with at least the second node and a third node, wherein the third node is different from the first node and the second node.

9. The system of claim 8, wherein updating the first proximity measure comprises adding an edge to a graph representing nodes in the network.

10. The system of claim 8, wherein the data includes a record that indicates the permission of the first node to access data via the second node.

11. The system of claim 8, wherein the data comprises a log entry.

12. The system of claim 8, wherein the updating the first proximity measure comprises changing the first proximity measure from indicating no path between the first node and second node to indicating a path portion between the first node and second node.

13. The system of claim 8, wherein detecting the path between the first node and the second node comprises connecting a first path comprising the first node and a second path comprising the second node.

14. The system of claim 8, wherein:
the data further indicates an attribute specifying that data may pass from the first node to the second node; and
the proximity measure of the first node is updated based at least in part on the attribute.

15. A non-transitory computer-readable storage medium comprising executable instructions that, if executed by one or more processors of a computer system, cause the computer system to at least:
update a first proximity measure associated with a first node and a second node in a network, based at least in part on information indicating at least a privilege of the second node to access data managed by the first node, to result in an updated first proximity measure, the updated first proximity measure being weighted according to a type of activity indicated by the information;
determine, based at least in part on the updated first proximity measure and a second proximity measure associated with at least the second node and a third node, whether a data path exists between a data source and a data sink, wherein the third node is different from the first node and the second node; and
indicate whether the data path exists between the data source and the data sink.

16. The non-transitory computer-readable storage medium of claim 15, wherein the first proximity measure is based at least in part on a network distance.

17. The non-transitory computer-readable storage medium of claim 15, wherein the first node and second node are both different from the data source and the data sink.

18. The non-transitory computer-readable storage medium of claim 15, wherein the information regarding the first node and the second node is from a log of events involving the network.

19. The non-transitory computer-readable storage medium of claim 15, wherein the information is based at least in part on a set of privileges of the first node or second node.

20. The non-transitory computer-readable storage medium of claim 15, wherein the measure indicates an ability of data to pass between the first node and the second node.

21. The computer-implemented method of claim 1, wherein:
the method further comprises determining, based at least in part on a sum of the first proximity measure and the second proximity measure, a security risk associated with the first node, the second node, and the third node; and
indicating whether the data path exists includes indicating the security risk.

22. The computer-implemented method of claim 21, wherein the security risk has an inverse relationship to the sum.

* * * * *